(12) United States Patent
Hsu

(10) Patent No.: US 7,245,095 B2
(45) Date of Patent: Jul. 17, 2007

(54) CONTROL CIRCUIT OF ROTATIONAL SPEED OF A FAN

(76) Inventor: Nien-Fu Hsu, No. 5, Lane 373, Sec. 1, Mingjhih Rd., Taishan Township, Taipei County 243 (TW)

( * ) Notice: Subject to any disclaimer, the term of this patent is extended or adjusted under 35 U.S.C. 154(b) by 0 days.

(21) Appl. No.: 11/242,885

(22) Filed: Oct. 5, 2005

(65) Prior Publication Data

US 2007/0075675 A1    Apr. 5, 2007

(51) Int. Cl.
*H02P 27/08*    (2006.01)
(52) U.S. Cl. ............... 318/254; 318/471; 318/799; 318/723; 318/812; 323/237
(58) Field of Classification Search .............. None
See application file for complete search history.

(56) References Cited

U.S. PATENT DOCUMENTS 5,691,628 A * 11/1997 Martin ................. 323/237

* cited by examiner

*Primary Examiner*—Lincoln Donovan
*Assistant Examiner*—Eduardo Colon Santanta
(74) *Attorney, Agent, or Firm*—Troxell Law Office, PLLC

(57) ABSTRACT

A control circuit of rotational speed of a fan is provided, wherein by a switching of a switch unit, a PWM (Pulse Wide Modulation) unit can output a sampling pulse whose period is changing. A voltage is also changing following the period after taking a sample to an AC voltage by the control unit. The voltage after sampling serves as a working voltage of a load unit, so as to enable a fan device and a lamp device of the load unit to achieve effects of adjusting speed and brightness.

6 Claims, 4 Drawing Sheets

CONTROL CIRCUIT OF ROTATIONAL SPEED OF A FAN

BACKGROUND OF THE INVENTION (a) Field of the Invention

The present invention relates to an improved control circuit of rotational speed of a fan, and more particularly to an improved circuit of a control unit which provides a working voltage to a load unit, using a change in a period of sampling pulse output from a PWM (Pulse Wide Modulation) unit to enable the load unit to efficiently perform an adjustment, thereby facilitating an adjustment of speed and brightness to a fan device and a lamp device.

(b) Description of the Prior Art

Referring to FIG. 1 and FIG. 2, a conventional control unit A1 of a control circuit A of rotational speed of a fan is composed of an SSR (Solid State Relay) circuit A2 which includes an input circuit A21, a coupler A22, and an output circuit A23. As the circuit is complex, the cost is correspondingly high. However, as there is still a small amount of current flowing through the SSR circuit A2 when it is cutoff, hence a working voltage output to a load unit A3 cannot efficiently adjust the speed of fan. Moreover, a reaction speed of the SSR will not be enough if a period of sampling pulse is getting shorter; causing that only an incandescent lamp can be used.

Accordingly, how to eliminate the aforementioned problems is a technical issue which needs to be solved by the inventor.

Shortcomings of a conventional application (1) The circuit is complex; hence its cost is high.

(2) It cannot efficiently achieve an effect of adjustment.

(3) When the sampling period is short, only the incandescent lamp can be used, thereby restricting the application.

SUMMARY OF THE INVENTION

The present invention is to provide an improved control circuit of rotational speed of a fan, and more particularly to an improved circuit of a control unit which provides a working voltage to a load unit, using a change in a period of sampling pulse output from a PWM (Pulse Wide Modulation) unit to enable the load unit to efficiently perform an adjustment, thereby facilitating an adjustment of speed and brightness to a fan device and a lamp device.

Advantages of the Present Invention (1) The electronic elements are simple; hence the cost can be saved.

(2) It can efficiently achieve effects of adjusting the speed of fan and the brightness of lamp.

(3) It can be applied to all kinds of circuits having an adjustment function; hence its application is broad.

(4) It has an advancement and practicability.

(5) It can promote an industrial competitiveness.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
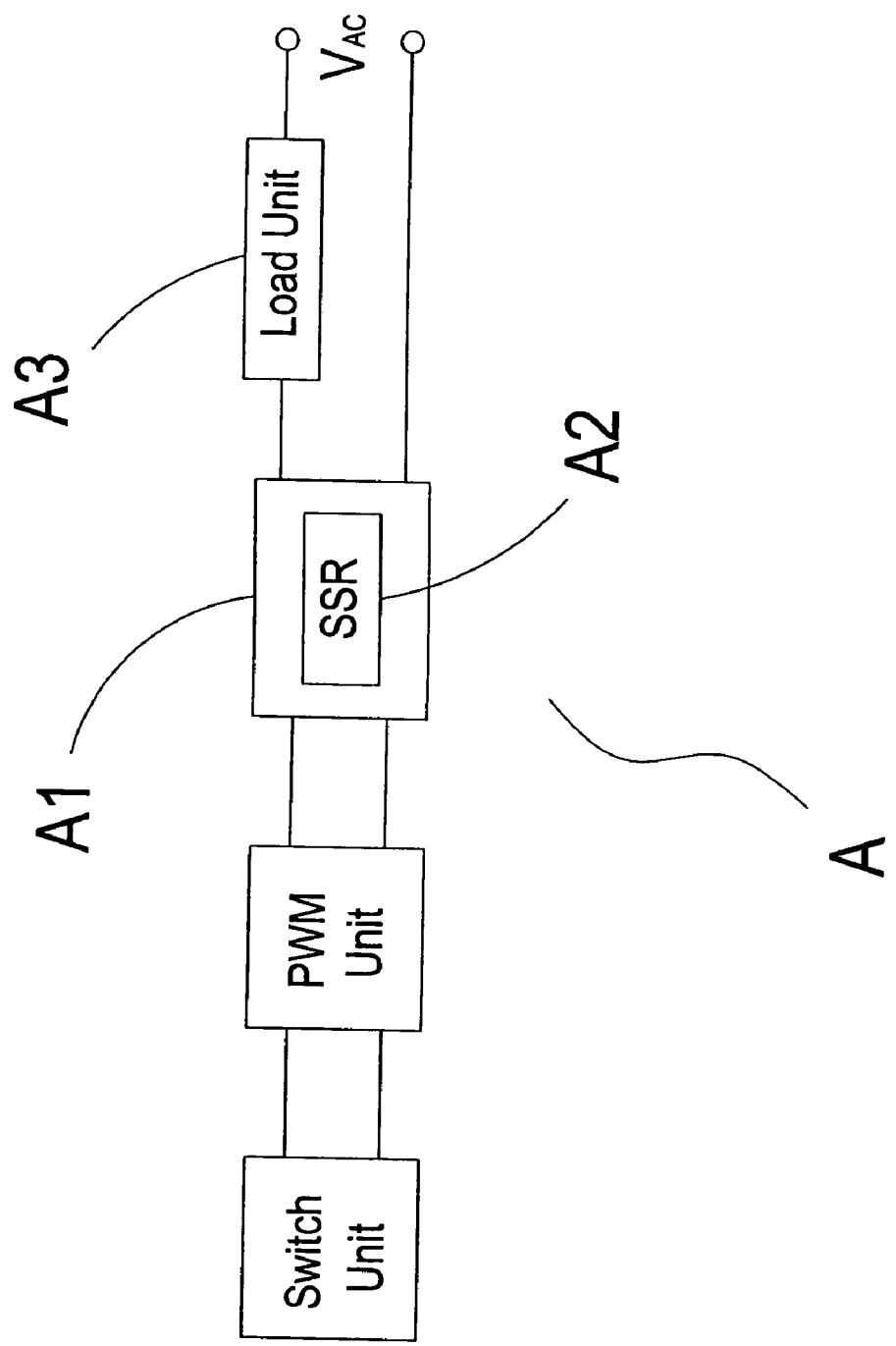
FIG. 1 shows a perspective view of a conventional application.
Figure 2:
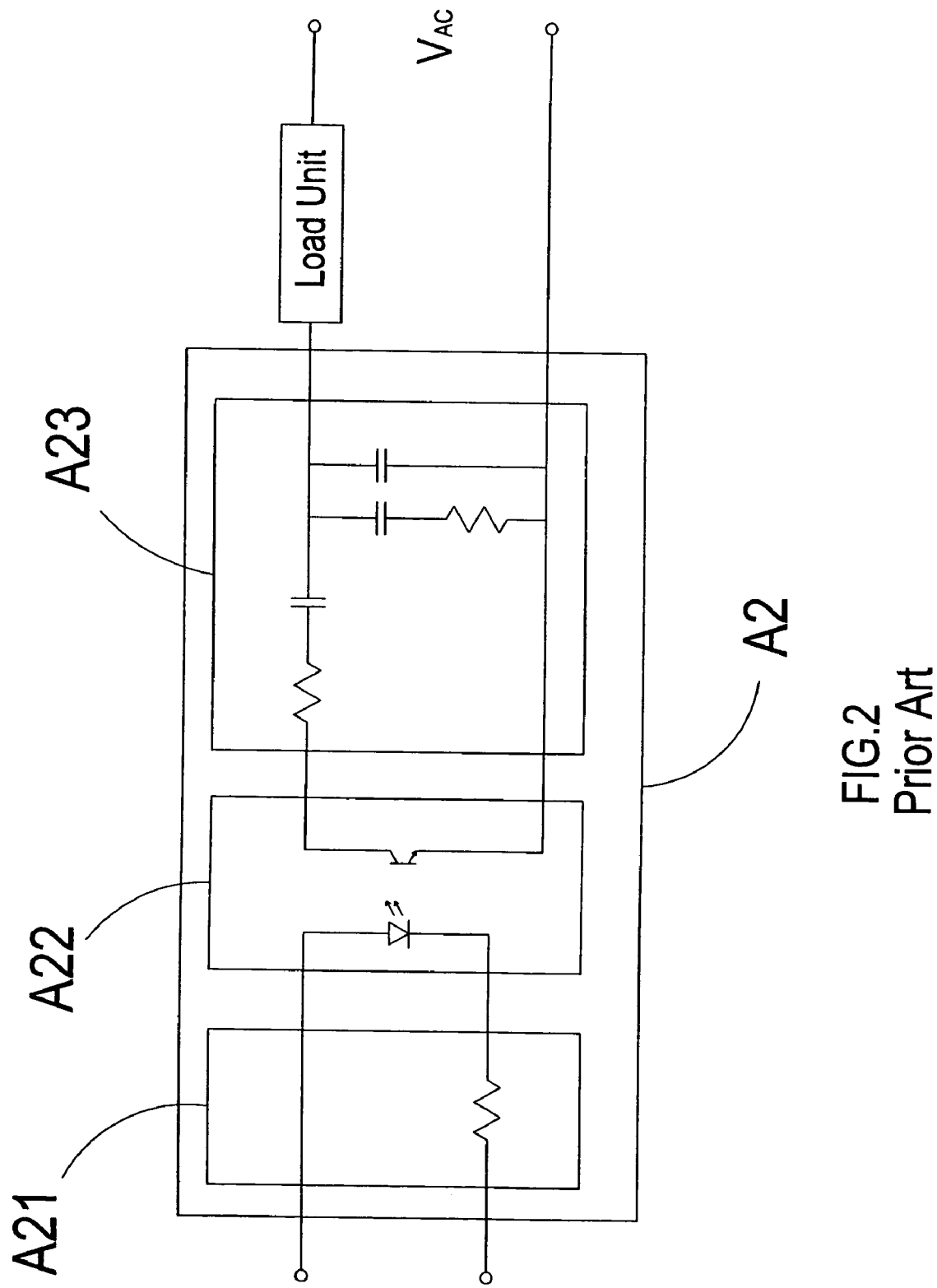
FIG. 2 shows a circuit diagram of a conventional SSR.
Figure 3:
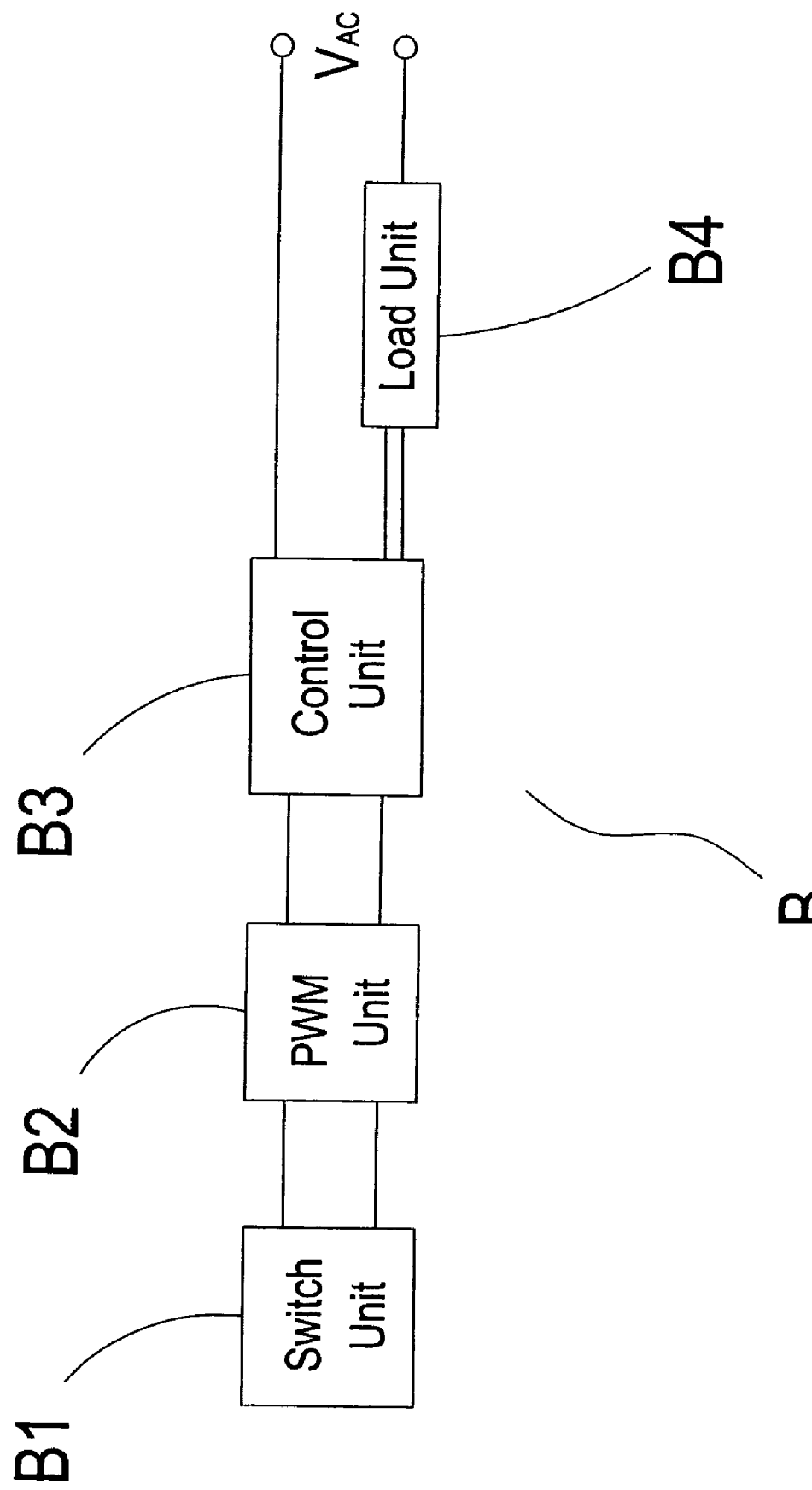
FIG. 3 shows a flow diagram of the present invention.

As shown in FIG. 3, a control circuit B is composed of a switch unit B1, a PWM (Pulse Wide Modulation) unit B2, a control unit B3, and a load unit B4. The switch unit B1 will connect a result selected by an internal circuit to the PWM unit B2 which will output a sampling pulse to the control unit B3. By using the sampling pulse, the control unit B3 will perform a sampling to an AC voltage $V_{AC}$, and serve the voltage after sampling as a working voltage of the load unit B4.

Figure 4:
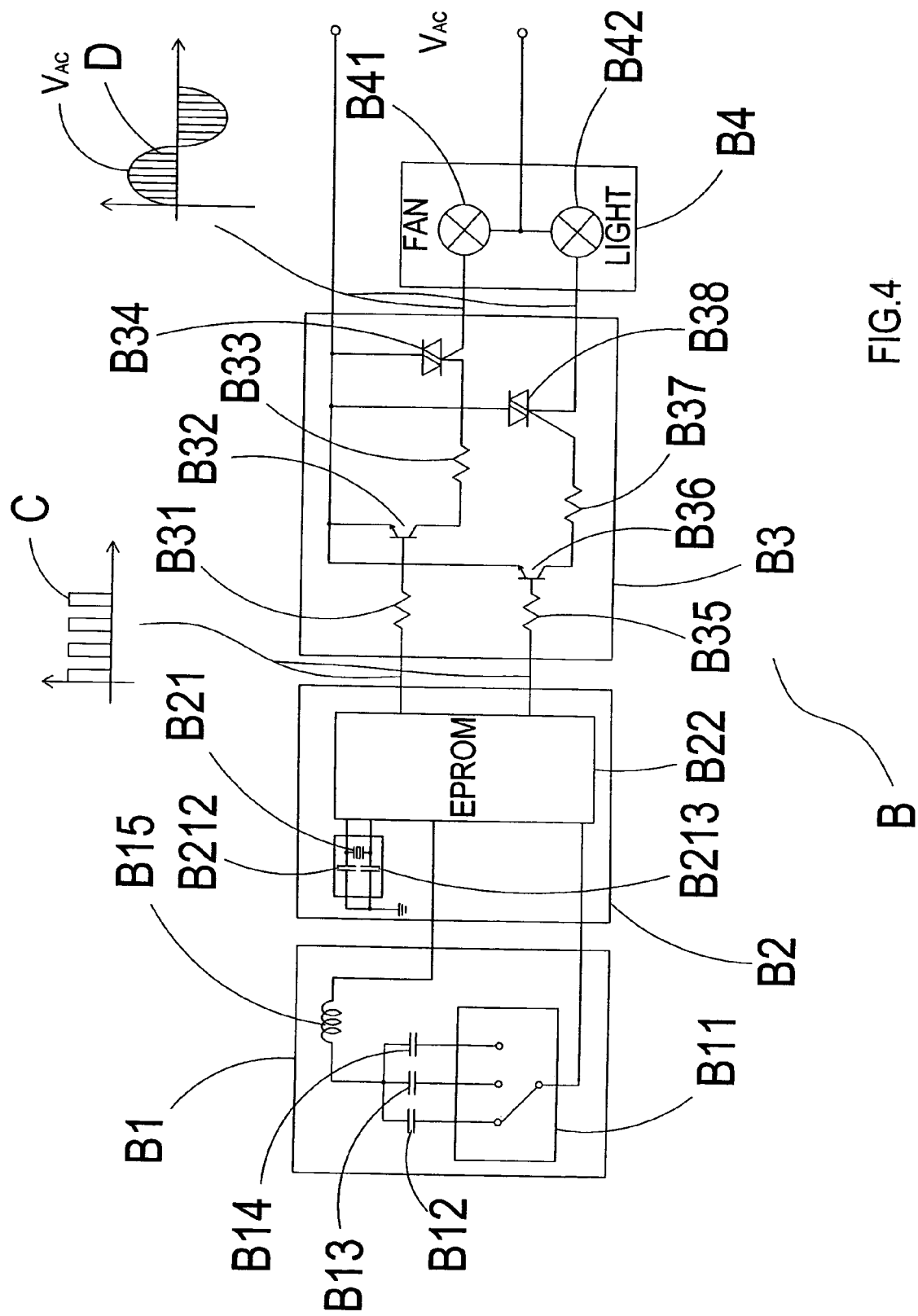
FIG. 4 shows a circuit diagram of the present invention.

Referring to FIG. 4, through a switching of multistage switch B11, a switch unit B1 of a control circuit B selects a capacitor B12 to serially connect to an inductor B15 and then connect to an EPROM (Erasable Programmable Read-Only Memory) circuit B22 in a PWM (Pulse Wide Modulation) unit B2. An oscillation pulse generated by an oscillation circuit B21 constituted by an oscillator B211 and capacitors B212, B213, will be input to the EPROM circuit B22, such that the EPROM circuit B22 can output a sampling pulse C with a change in a high, low potential to a control circuit B3. When the sampling pulse C reaches to the high potential, the potential will pass through resistors B31, B35 to drive bases of transistors B32, B36 to be forward biased, thereby conducting the transistors B32, B36. In the mean time, a current will pass through resistors B33, B37 to trigger gates of TRIAC (Triode AC Semiconductor Switch) B34, B38, such that the TRIAC B34, B38 will be conducted, allowing the AC voltage $V_{AC}$ to pass through B34 and transmit to the load unit B4, in order to serve as a working voltage D of a fan device B41 and a lamp device B42. On the other hand, when the sampling pulse C reaches to the low potential, as there is no potential passing through the bases of transistors B32, B36 from the resistors B31, B35, the transistors B32, B36 will be cut off. In the mean time, there is no current passing through the resistors B33, B37, which will not be able to trigger the gates between TRIAC B34, B38. Therefore, the TRIAC B34, B38 are cut off, such that the AC voltage $V_{AC}$ is not able to pass through, thereby providing no working voltage to the load unit B4. Accordingly, a change in high, low potential occurs repeatedly in the sampling pulse C, which will in turn cause a change in the working voltage D.

A number of conducted pulses within one period of the AC voltage $V_{AC}$ of the working voltage D are dependent upon the period of sampling pulse C. When the multistage switch B11 of the switch unit B1 is switching among different capacitors B12, B13, B14, the period of sampling pulse C output correspondingly by the PWM unit B2 is also changed in its magnitude, which will in turn change the number of conducted pulses of the working voltage D, such that when the number of conducted pulses of the working voltage is large, the fan device B41 and the lamp device B42 of the load unit will generate a fast rotation and a high brightness; whereas, on the contrary, when the number of conducted pulses of the working voltage D is small, the fan device B41 and the lamp device B42 will generate a slow rotation and a low brightness, thereby facilitating an efficient adjustment of speed and brightness to the fan device B41 and the lamp device B42.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A control circuit of rotational speed of a fan, wherein a switching is performed by a multistage switch in a switch unit, which will in turn change a period of sampling pulse output by a PWM (Pulse Wide Modulation) unit; its characteristics being that by the sampling pulse provided from the PWM unit which is serially connected, a control unit will in turn perform a sampling action to an AC voltage, and then serve the voltage after sampling as a working voltage of a load unit; the working voltage being changed following a change in period of the sampling pulse, thereby enabling the load unit to efficiently achieve an effect of adjustment, wherein the switch unit is constituted by a multistage switch connected with a plurality of capacitors and inductors; various configuration of capacitors and inductors being selected by a switching of the multistage switch, so as to change the period of sampling pulse output by the PWM unit.

2. The control circuit of rotational speed of a fan according to claim 1, wherein the PWM (Pulse Wide Modulation) unit is composed of an oscillation circuit and a EPROM (Erasable Programmable Read-Only Memory) circuit, which writes into the memory via a program and next accepts a switching choice from the switch unit, and in turn outputs a sampling pulse correspondingly.

3. The control circuit of rotational speed of a fan according to claim 1, wherein the control unit is a circuit constituted by a plurality of resistors serially connected to a transistor which is connected to a TRIAC (Triode AC Semiconductor Switch) through a resistor which receives a sampling pulse and is followed by generating a series of actions for taking a sample to the AC voltage.

4. The control circuit of rotational speed of a fan according to claim 1, wherein the load unit can be further a fan device, a lighting device, a heating device, a sounding device, and a related device with an adjustment function.

5. A control circuit of rotational speed of a fan, wherein a switching is performed by a multistage switch in a switch unit, which will in turn change a period of sampling pulse output by a PWM (Pulse Wide Modulation) unit; its characteristics being that by the sampling pulse provided from the PWM unit which is serially connected, a control unit will in turn perform a sampling action to an AC voltage, and then serve the voltage after sampling as a working voltage of a load unit; the working voltage being changed following a change in period of the sampling pulse, thereby enabling the load unit to efficiently achieve an effect of adjustment, wherein the PWM (Pulse Wide Modulation) unit is composed of an oscillation circuit and a EPROM (Erasable Programmable Read-Only Memory) circuit, which writes into the memory via a program and next accepts a switching choice from the switch unit, and in turn outputs a sampling pulse correspondingly.

6. A control circuit of rotational speed of a fan, wherein a switching is performed by a multistage switch in a switch unit, which will in turn change a period of sampling pulse output by a PWM (Pulse Wide Modulation) unit; its characteristics being that by the sampling pulse provided from the PWM unit which is serially connected, a control unit will in turn perform a sampling action to an AC voltage, and then serve the voltage after sampling as a working voltage of a load unit; the working voltage being changed following a change in period of the sampling pulse, thereby enabling the load unit to efficiently achieve an effect of adjustment, wherein the control unit is a circuit constituted by a plurality of resistors serially connected to a transistor which is connected to a TRIAC (Triode AC Semiconductor Switch) through a resistor which receives a sampling pulse and is followed by generating a series of actions for taking a sample to the AC voltage.

* * * * *